US009087082B2

(12) United States Patent
Branson et al.

(10) Patent No.: US 9,087,082 B2
(45) Date of Patent: Jul. 21, 2015

(54) PROCESSING CONTROL IN A STREAMING APPLICATION

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 13/789,638

(22) Filed: Mar. 7, 2013

(65) Prior Publication Data

US 2014/0258290 A1    Sep. 11, 2014

(51) Int. Cl.
G06F 7/00 (2006.01)
G06F 17/30 (2006.01)

(52) U.S. Cl.
CPC .... *G06F 17/30286* (2013.01); *G06F 17/30442* (2013.01); *G06F 17/30516* (2013.01)

(58) Field of Classification Search
CPC .................. G06F 17/30442; G06F 17/30516
USPC ...................................................... 707/737
See application file for complete search history.

(56) References Cited

U.S. PATENT DOCUMENTS

| 7,613,848 B2 | 11/2009 | Amini et al. |
| 7,644,110 B2 | 1/2010 | Nishizawa et al. |
| 8,095,690 B2 | 1/2012 | Kashiyama et al. |
| 2008/0275891 A1* | 11/2008 | Park et al. ...................... 707/100 |
| 2009/0049187 A1* | 2/2009 | Gedik et al. ................... 709/231 |
| 2010/0229178 A1* | 9/2010 | Ito ................................. 718/104 |
| 2011/0119270 A1 | 5/2011 | Jin et al. |
| 2011/0302164 A1* | 12/2011 | Krishnamurthy et al. ..... 707/737 |
| 2012/0078939 A1* | 3/2012 | Chen et al. ..................... 707/769 |
| 2012/0078951 A1* | 3/2012 | Hsu et al. ....................... 707/769 |
| 2012/0209822 A1* | 8/2012 | Prabhakar et al. ............. 707/703 |
| 2012/0215934 A1 | 8/2012 | Barsness et al. |
| 2012/0218268 A1 | 8/2012 | Accola et al. |

OTHER PUBLICATIONS

Ballard et al., "IBM InfoSphere Streams: Harnessing Data in Motion", Sep. 2010. 360 pages, IBM Redbooks. http://www.redbooks.ibm.com/abstracts/sg247865.html.
Kankanhalli et al., "Experiential Sampling on Multiple Data Streams", IEEE Transactions on Multimedia, Oct. 2006. vol. 8, Issue 5. pp. 1-9.
Santosuosso et al., "Management System for Processing Streaming Data", filed Jul. 26, 2011. U.S. Appl. No. 13/190,810.

* cited by examiner

*Primary Examiner* — Fred I Ehichioya
*Assistant Examiner* — Kris Mackes
(74) *Attorney, Agent, or Firm* — Penny L. Lowry; James R. Nock

(57) ABSTRACT

A method, system, and computer program product for processing a stream of tuples are disclosed. The method, system, and computer program product may include receiving a stream of tuples to be processed by a plurality of processing elements. Each tuple may have an associated processing history. The stream of tuples may be segmented into a plurality of partitions, each representing a subset of the stream of tuples. The method, system, and computer program product may include estimating the contribution each partition will have on a particular processing result and processing a partition if it substantially contributes to the particular processing result.

5 Claims, 8 Drawing Sheets

PROCESSING CONTROL IN A STREAMING APPLICATION

FIELD

This disclosure generally relates to stream computing, and in particular, to computing applications that receive streaming data and process the data as it is received.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program receive streaming data to be processed by a plurality of processing elements comprising one or more stream operators.

One embodiment is directed to a method for processing a stream of tuples in a streaming application. The method may include a mechanism for controlling whether to omit some of the processing in a streaming application. The method may include receiving a stream of tuples to be processed by a plurality of processing elements. Each tuple may have an associated processing history. The stream of tuples may be segmented into a plurality of partitions, each representing a subset of the stream of tuples. The method may include estimating the contribution each partition will have on a particular processing result. The method may also include processing a partition if it substantially contributes to the particular processing result.

Another embodiment is directed to a system for processing a stream of tuples in a streaming application. The system may include a mechanism for controlling whether to omit some of the processing in a streaming application. The system may include receiving a stream of tuples to be processed by a plurality of processing elements. Each tuple may have an associated processing history. The stream of tuples may be segmented into a plurality of partitions, each representing a subset of the stream of tuples. The system may include estimating the contribution each partition will have on a particular processing result. The system may also provide for processing a partition if it substantially contributes to the particular processing result.

Yet another embodiment is directed to a computer program product.

BRIEF DESCRIPTION OF THE DRAWINGS

Like reference numbers and designations in the various drawings indicate like elements.

DETAILED DESCRIPTION

Figure 1:
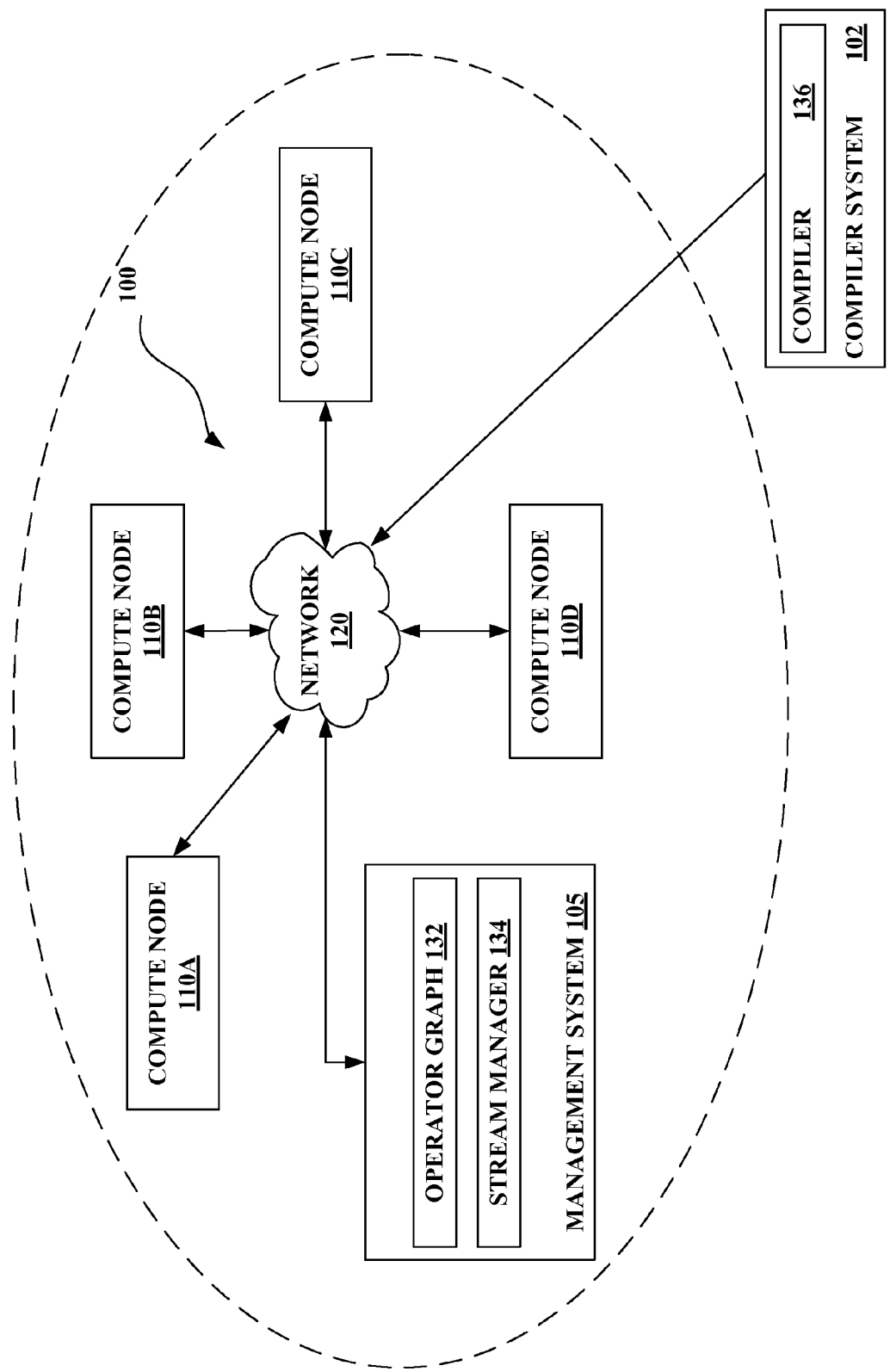
FIG. 1 illustrates a computing infrastructure configured to execute a stream computing application, according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream-based computing application, stream operators are connected to one another such that data flows from one stream operator to the next (e.g., over a TCP/IP socket). Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application.

A "tuple" is data. More specifically, a tuple is a sequence of one or more attributes associated with an entity. Attributes may be any of a variety of different types, e.g., integer, float, Boolean, string, etc. The attributes may be ordered. A tuple may be extended by adding one or more additional attributes to it. In addition to attributes associated with an entity, a tuple may include metadata, i.e., data about the tuple. As used herein, "stream" or "data stream" refers to a sequence of tuples. Generally, a stream may be considered a pseudo-infinite sequence of tuples.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

In some embodiments, a streaming application may be configured to complete less than all of its processing while still providing a result of that processing that is representative of the entire processing. That is, the streaming application may be able to determine some portion of the processing that may be omitted and approximate the result that would otherwise be achieved if the entire processing were completed. In some embodiments, the portion of the processing that is omitted is determined in a way that maintains a high confidence level that the remaining processing provides an end result that is statistically representative of the end result when all processing is completed. In other embodiments, the streaming application may estimate the contribution of some portion of the processing and select portions of the processing that may substantially affect the end result.

In some embodiments, the method to control processing may be enabled when one or more performance metrics of the streaming application fall outside a threshold. For example, if the performance metric tracks latency of a tuple and the latency metric is above a certain threshold, the streaming application may not be processing data as quickly as desired. Accordingly, disabling some portion of the processing may improve the latency, which may improve the performance of the entire streaming application. In some embodiments, the streaming application may select the portion to omit from processing, while in other embodiments the streaming application may select the portions to include in processing, which may in turn omit some portions of the processing. In some embodiments, processing may be omitted to optimize the performance of the streaming application, such as maintaining a low latency metric during runtime.

"Latency," as used herein, may refer to the amount of time a particular tuple is at a processing element. That is, the latency may be the time difference between the timestamp at which a tuple is received at a processing element and the timestamp at which the tuple is output from the processing element, including time in which the tuple is waiting to be processed.

A streaming application may be configured to concurrently process a plurality of tuples. Concurrent processing may be accomplished by segmenting a data stream into a plurality of partitions, thereby distributing the load across multiple hosts. A "partition" may be considered to be a subset of a data stream. The partitioning may be based on one or more values of the incoming tuples in some embodiments, as specified by an application programmer. For example, a stream of tuples containing information about employees may be partitioned based on an attribute containing department numbers. In some embodiments, once the plurality of partitions are processed, the resulting tuples may be joined together to aggregate the individual results into the end result that was the goal of the processing of the streaming application. In other embodiments, each partition may provide an individual result.

In some embodiments, segmenting based on the one or more values may generate a large number of partitions and therefore a significant amount of concurrent processing. In such a case, concurrently processing the tuples may negatively impact the performance of the streaming application. There may, however, be one or more partitions that do not substantially contribute to the end result that is the goal of the processing. For example, a first partition may not substantially contribute to a desired result if it is substantially similar to a second partition. The end result of processing a first partition may be substantially similar to the end result of processing a second partition if the end results of processing the partitions are statistically similar. If the end result of processing with the modified processing is within a threshold confidence level, the omitted partition may not substantially contribute to the end result of the full processing.

A "confidence level" may be used to determine whether a partition substantially contributes to an end result. A "confidence level," in some embodiments, may require a statistical comparison of the end result with all partitions processed and the end result with less than all partitions processed to be within some range of each other. In some embodiments, a confidence factor may also be used to refer to a confidence level. The confidence level may be a system default value that is capable of being overridden by an application programmer. Reducing the amount of processing a streaming application executes in order to obtain results may, in some embodiments, improve its overall performance. The processing results of one or more of the remaining partitions may be considered to be representative, or a statistical representation within a threshold confidence level, of the processing results for the entire data stream even though some portion of the data is not being processed.

Eliminating processing of partitions may, in some embodiments, be accomplished through the use of a processing history that may be maintained by the streaming application. For example, a streaming application may maintain a processing history that includes input tuple values for a partition, output tuple values for a partition, and the end result obtained by processing the various partitions. In some embodiments, the processing history of the tuples may be used to maintain a partition processing history. The processing history may, for example, be used to determine to omit processing for a partition that contains substantially similar output tuple values for a plurality of partitions. In other embodiments, the processing history may be used to predict which partitions may yield a processing result that is representative, within a threshold confidence level, of the entire processing. For example, a first stream operator may ask for information based on criteria A and need partitions 1, 2, and 3 to provide a representative result, while a second stream operator may ask for information based on criteria B and need partitions 3 and 4. A third stream operator that queries information based on criteria A and B may yield a representative answer with partitions 1, 2, 3, and 4 (a combination of A and B), which may be predicted based on the processing histories of the first and second stream operators.

FIG. 1 illustrates one exemplary computing infrastructure 100 that may be configured to execute a stream-based computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

Figure 2:
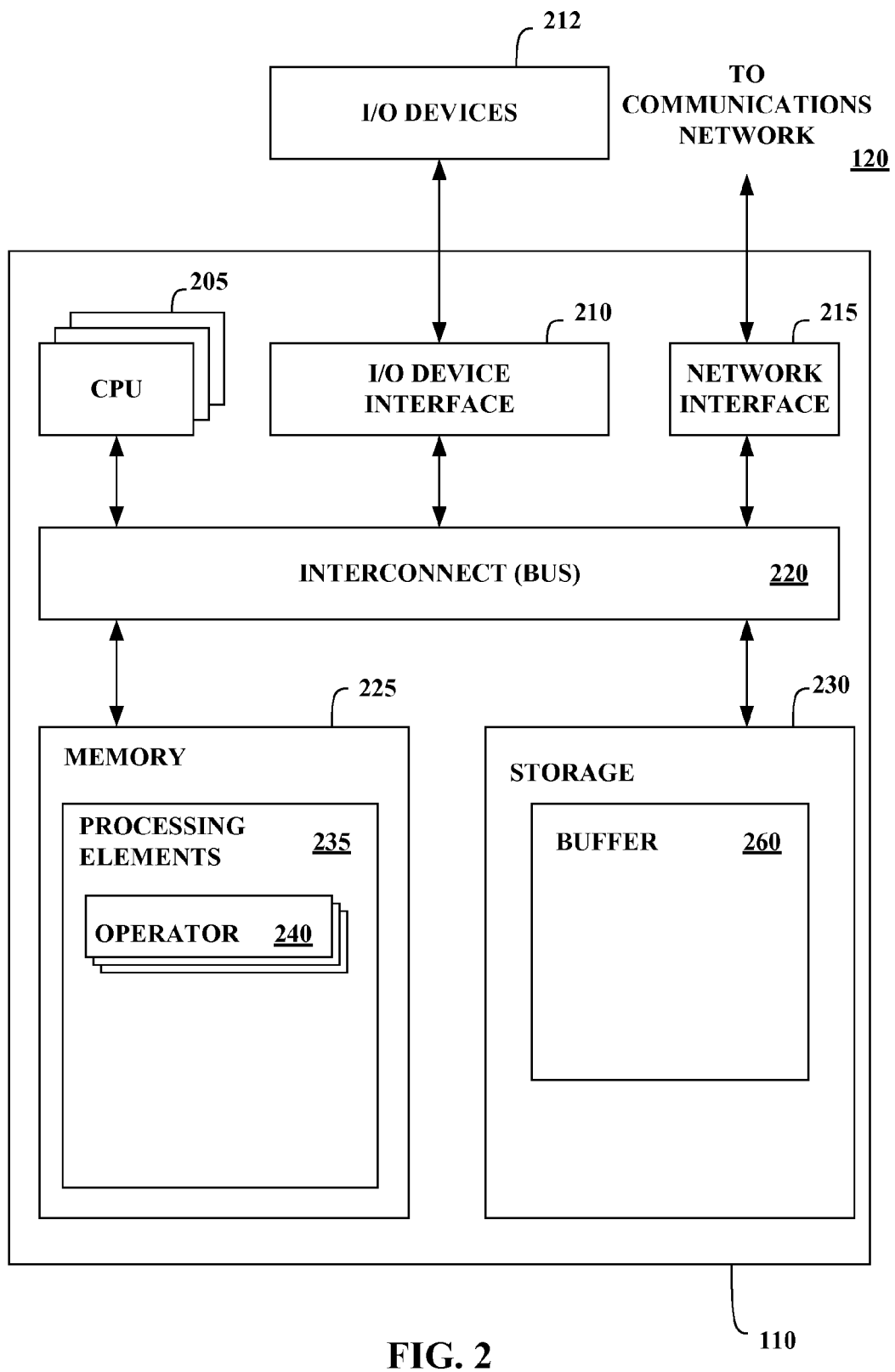
FIG. 2 illustrates a more detailed view of a compute node of FIG. 1, according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A streams application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

Figure 3:
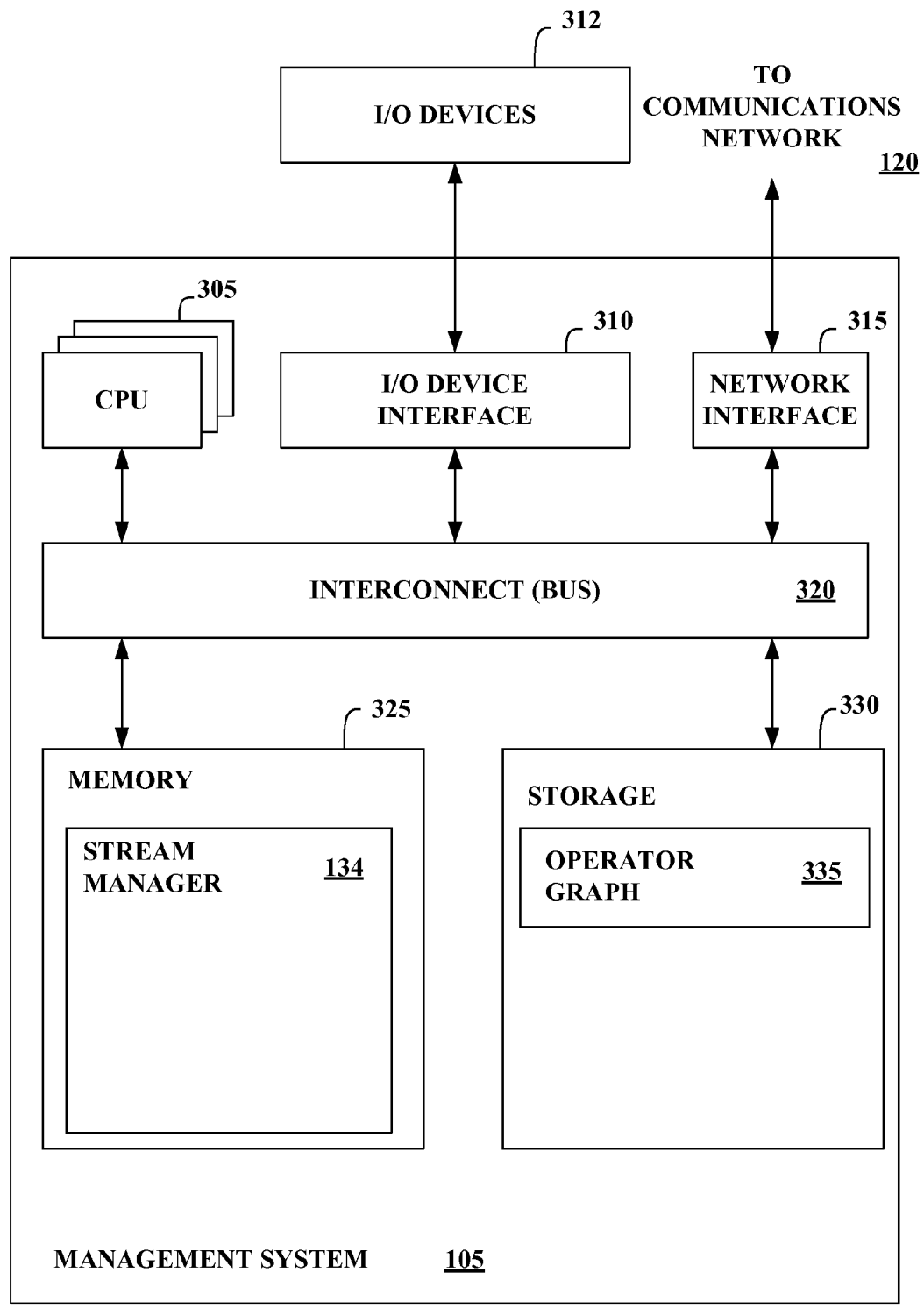
FIG. 3 illustrates a more detailed view of the management system of FIG. 1, according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

Figure 4:
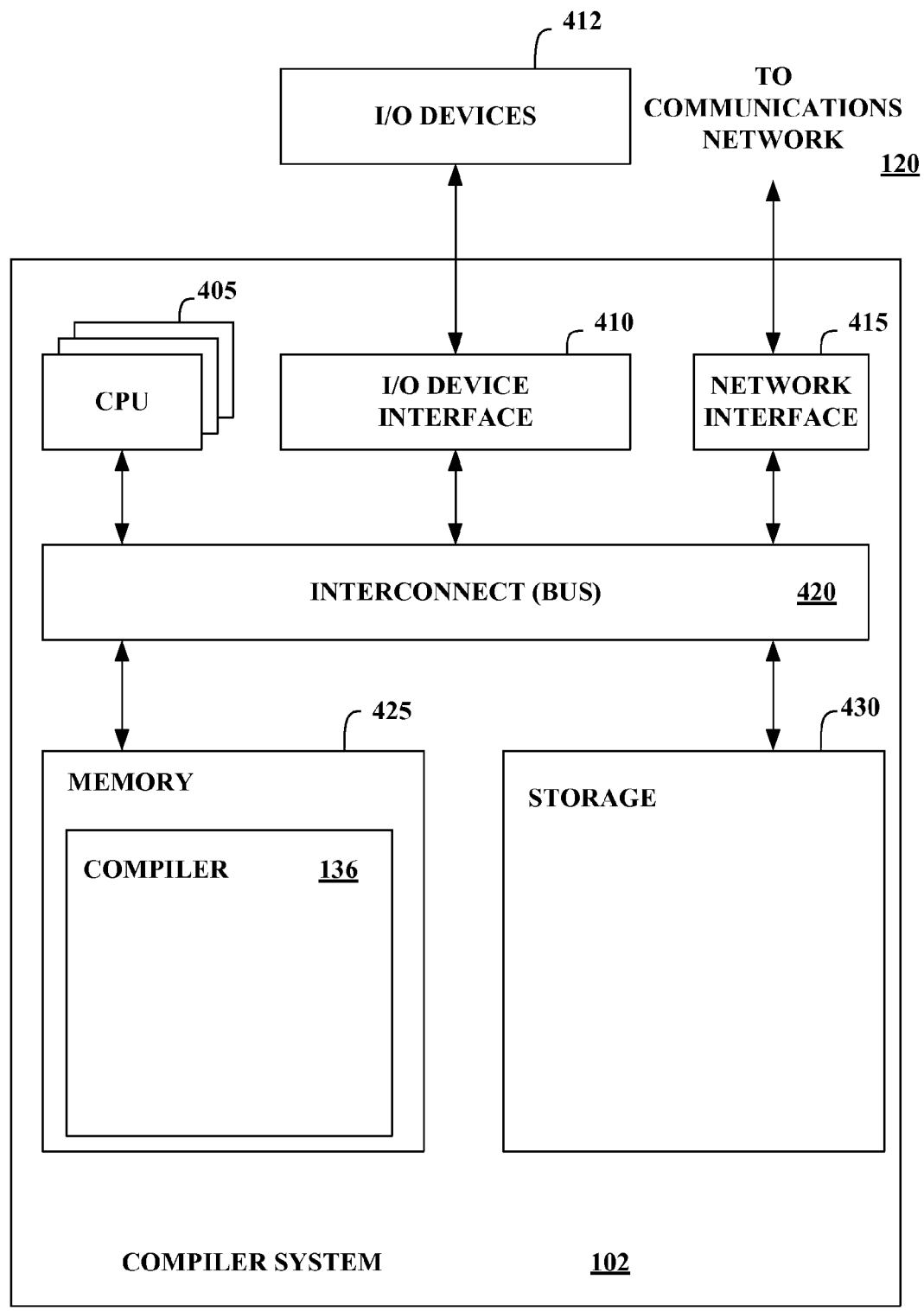
FIG. 4 illustrates a more detailed view of the compiler system of FIG. 1, according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the streaming application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
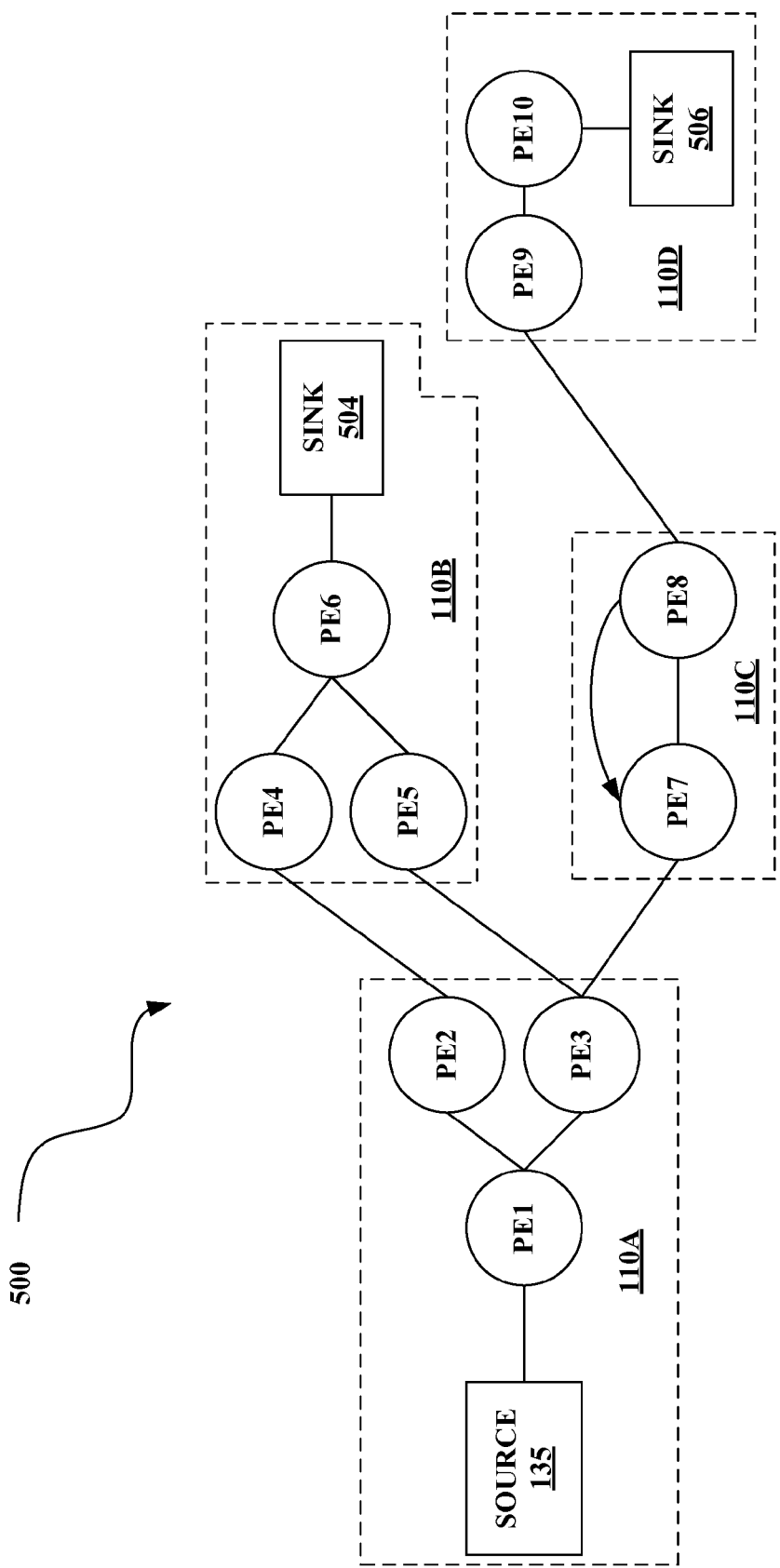
FIG. 5 illustrates an operator graph for a stream computing application, according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins).

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

The tuple received by a particular processing element 235 (FIG. 2) is generally not considered to be the same tuple that is output downstream. Typically, the output tuple is changed in some way. An attribute or metadata may be added, deleted, or changed. However, it is not required that the output tuple be changed in some way. Generally, a particular tuple output by a processing element may not be considered to be the same tuple as a corresponding input tuple even if the input tuple is not changed by the processing element. However, to simplify the present description and the claims, an output tuple that has the same data attributes as a corresponding input tuple may be referred to herein as the same tuple.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
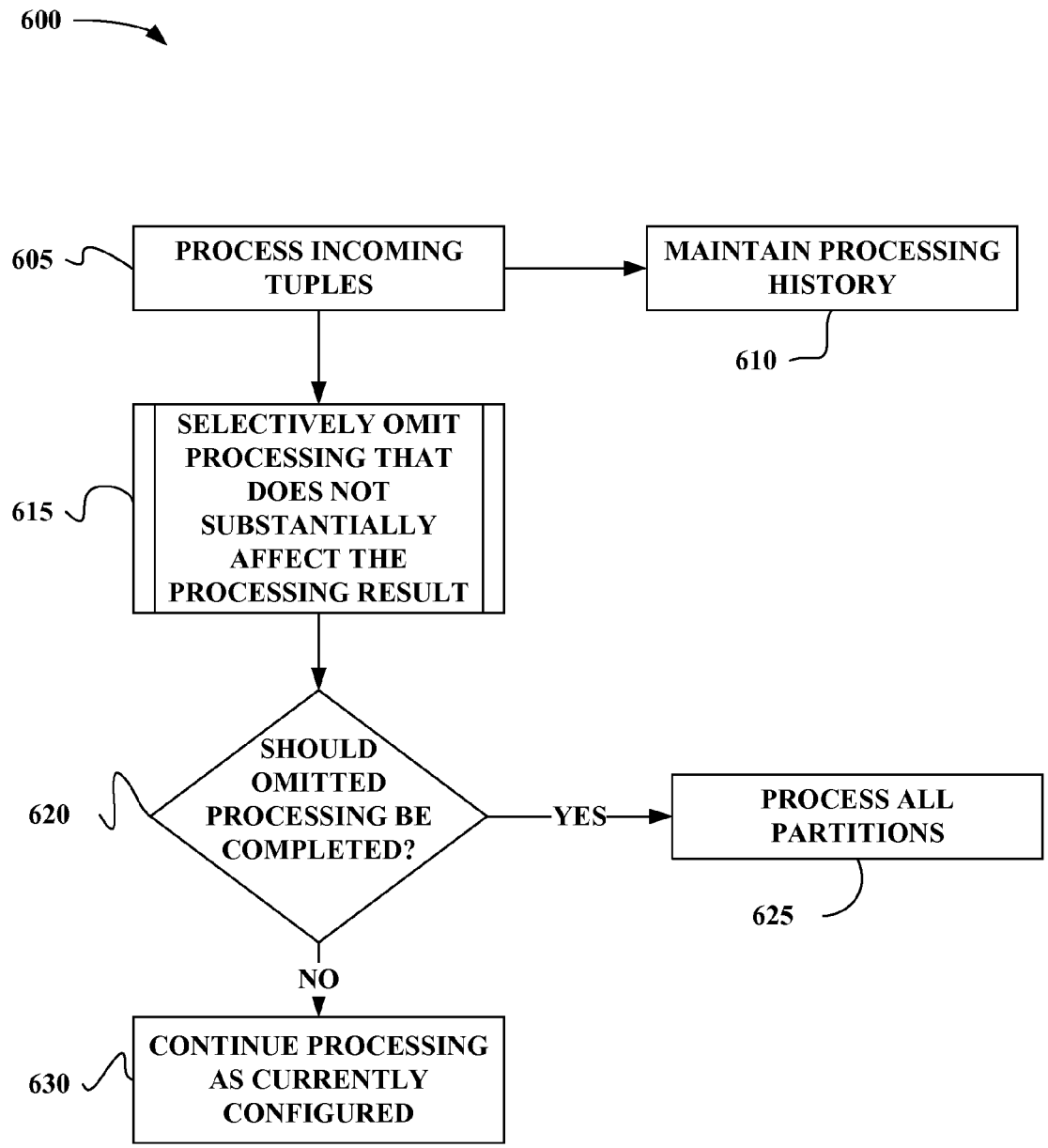
FIG. 6 illustrates a method to control processing in a streaming application, according to various embodiments.

FIG. 6 illustrates a method 600 to control processing in a streaming application, according to various embodiments. In some embodiments, "controlling processing" may include determining whether to omit some of the processing of a streaming application. In other embodiments, "controlling processing" may include determining which portions of a streaming application should be processed. "Omitting processing" may include disabling processing for one or more partitions. In other embodiments, "omitting processing" may include deactivating processing, truncating processing, or other similar methods of omitting a portion of the processing of the streaming application. As described above, a partition may be a segment (or subset) of an incoming data stream, and may, for example, be based on one or more attribute values of a tuple. In some embodiments, omitting processing for one or more partitions may minimize CPU and system resource constraints. In other embodiments, omitting processing for one or more partitions may also improve the performance, which may, for example, be measured by latency for a tuple.

The method 600 may be configured to execute upon various conditions. For example, the method 600 may be enabled once per day, may be enabled in accordance with a windowing condition, or may be enabled or disabled using a configuration file that specifies various rules. A rule for enabling or disabling the method 600 may be configurable, and may include, for example, conditions based on tuple counts, addition or removal of hardware, time of day, latency metrics, or other similar conditions. In other embodiments, such a rule may be based on resource constraints. In yet other embodiments, the method 600 may be enabled by default to attempt to maximize the performance of a streaming application. As previously mentioned, the method 600 may use a windowing condition as bounds for enabling and disabling the method. For example, the method may omit processing during the life of the window, but upon expiration of the window, the omitted processing will be reactivated.

A "window," as referred to herein, is a logical container for tuples received by an input port of a stream operator. Windowing may allow for creation of subsets of data within a streaming application. A stream operator may not necessarily support windowing by default. A stream operator may, however, be configured to support windowing. Both tumbling and sliding windows may store tuples according to various conditions. A tumbling window may store incoming tuples until the window is full, then may trigger a stream operator behavior, flush all stored tuples from the window, and then may begin this process again. Conversely, a sliding window does not automatically flush the window when the trigger condition is fulfilled. A sliding window also has an eviction policy that tells the window when to flush the window and begin this process again. These conditions may be referred to herein as windowing conditions. Windowing may be defined in any number of ways. For example, an application programmer may define one or more specific windowing conditions. Additionally, the system may provide a set of windowing conditions.

Generally, the method 600 may include monitoring the processing history of a streaming application and determining whether to omit processing based on the processing history. The processing history may, in some embodiments, be stored in a data store, e.g., a database or memory structure, that is accessible to the stream manager 134 In some embodiments, this may include processing one or more tuples to determine which partitions substantially contribute to an end result of a streaming application. In other embodiments, the streaming application may, at some interval, determine whether the modified processing is still representative of the whole processing.

The method 600 may, in some embodiments, process a stream of tuples to determine which partitions are representative of the end result. The method 600 may then determine to omit processing of partitions that do not substantially contribute to the end result. In other embodiments, the method 600 may omit processing for partitions that are not determinative of an end result. In yet other embodiments, the method 600 may omit processing for partitions that are not statistically significant in determining an end result.

The method 600 may begin at operation 605 with one or more stream operators processing incoming tuples. Operation 605 may include completing all processing according to the configuration of the streaming application. Operation 610 may record the processing history for a tuple as it is processed in operation 605. For example, the input values and output values for a given tuple may be maintained in the processing history. In some embodiments, the processing history may include additional information about how the tuple was processed. In other embodiments, the processing history for a given tuple may be used to populate the processing history for a particular partition.

At operation 615, the method 600 may determine partitions that should not be processed and omit that processing, according to some embodiments. Partitions that should not be processed may be those that do not substantially contribute to the end processing result. In other embodiments, partitions that should not be processed are those that are not determinative of the end result. In yet other embodiments, partitions that should not be processed are those that are not statistically significant in determining the result. Examples of partitions that either may not substantially contribute to the result or that are not outcome determinative may include partitions that have values that are similar to another partition (within a standard deviation that may be system provided, but capable of being overridden by an application programmer) or partitions that have values that are substantially smaller than the values of another partition, such that there is little effect on the end processing result. The details of the decision process will be described in greater detail in accordance with FIG. 7 below.

An example of a partition that may be omitted from processing may be observed in a streaming application that completes processing on incoming stock information. The streaming application may be configured to segment the data stream into partitions according to the sector in which the corporation belongs, such as industrial, healthcare, technology, utilities, etc. The end result of the processing may be some sort of indication of how a particular industry is performing. In such a streaming application, the processing history may indicate that the industrial and utilities sectors track each other, within a threshold deviation. Accordingly, the processing for one of the sectors may be omitted because the end result of the other sector's processing may be representative of both sectors. In some embodiments, the threshold deviation may be applied to the end result.

At operation 620, the method 600 may determine whether the omitted processing should be completed, according to some embodiments. The determination of operation 620 is a method of ensuring that the modified processing (with omitted processing) continues to provide processing results that are representative of the entire data. The determination of operation 620 may be triggered in various manners. For example, in some embodiments the determination can be made at a time interval. In other embodiments, the determination can be based upon a confidence level. In such an embodiment, the system may provide a default confidence level that is capable of being overridden by an application programmer. If the end result falls outside the confidence level, then the determination of operation 620 may indicate that all processing should be completed. If the result of the determination at operation 620 is that the modified processing is still representative of the full processing, then the modified processing may continue 630. If the result of the determination is that the omitted processing should be completed, then all processing (including the omitted partitions) will be completed again at operation 625.

Figure 7:
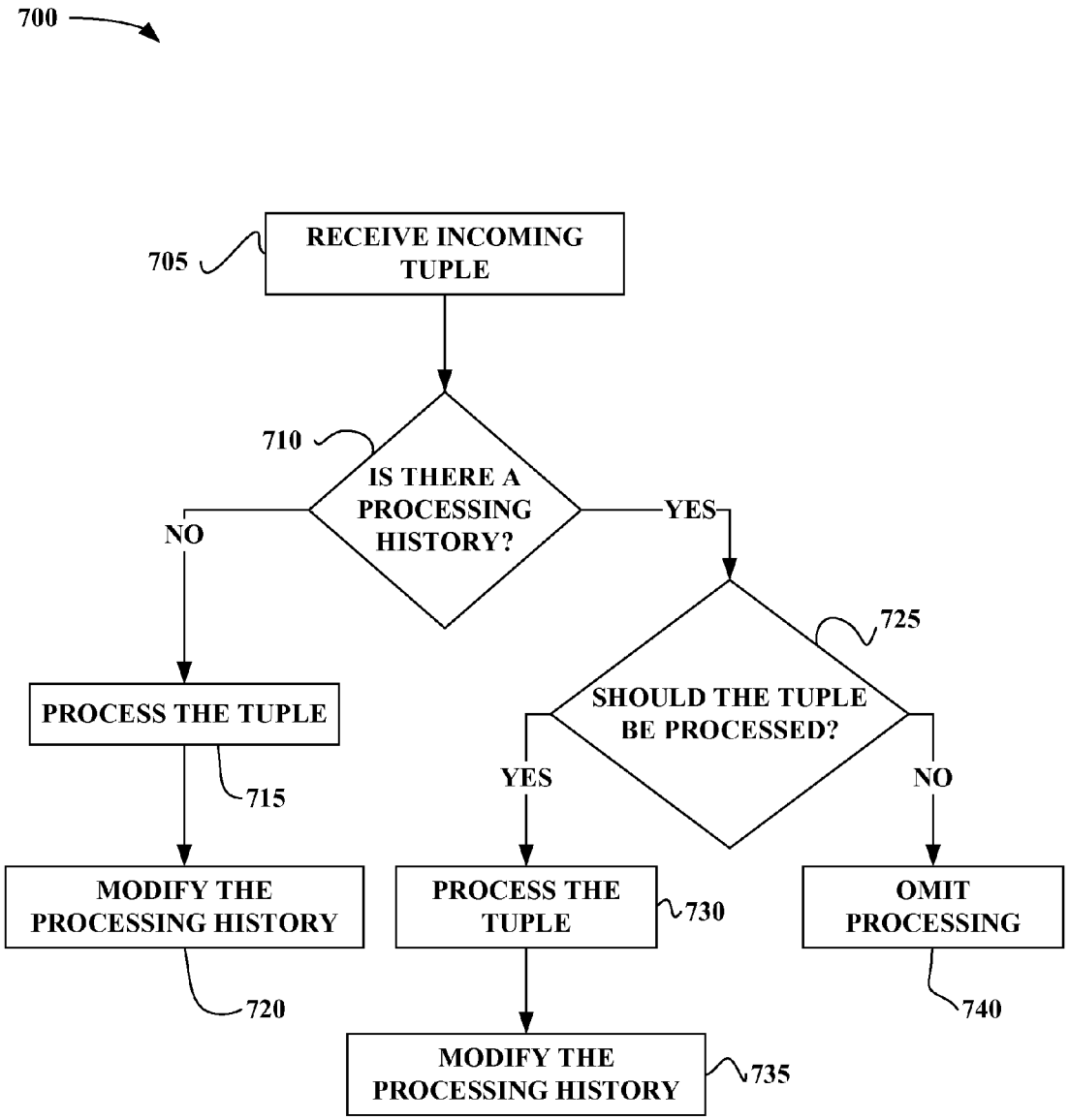
FIG. 7 illustrates a method to determine whether to omit processing for a partition in a streaming application, according to various embodiments.

FIG. 7 illustrates a method 700 to determine whether to omit processing a partition in a streaming application, according to various embodiments. As mentioned above, the method 700 may further describe operation 615 of the method 600. Generally, the method 700 describes the manner in which a streaming application may determine whether or not to omit processing for a partition.

The method 700 may begin at operation 705, when a stream operator receives an incoming tuple. Upon receiving a tuple, the stream operator may determine whether there is a processing history at operation 710. The determination of operation 710 may be based on the attribute value or values that are used to segment the incoming data stream into multiple partitions. While the determination of operation 710 is currently discussed as being performed by a stream operator, the functionality may also be performed by the stream manager 134 in some embodiments. In other embodiments, the stream manager 134 may perform some of the functionality while the particular stream operator performs the rest of the functionality of operation 710. For simplicity, the operations will be considered to be performed by a stream operator herein.

If there is no processing history identified in operation 710, the tuple may be processed by operation 715 and the processing history may be modified accordingly at operation 720. If, however, a processing history is identified in operation 710, the method 700 may continue with operation 725, in which the stream operator determines whether the tuple should be processed. Operation 725 may include multiple determinations in order to determine whether or not to omit processing.

At operation 725, the stream operator may determine whether processing for the partition corresponding to the particular tuple has already been omitted. In other embodiments, operation 725 may determine whether the partition includes one or more output values that are duplicative of other partitions. In yet other embodiments, operation 725 may include a determination of whether the partition corresponding to the particular tuple may substantially contribute to the end result. A tuple may substantially contribute to the end result if it is statistically significant to determining the end result in some embodiments. In other embodiments, the particular tuple may substantially contribute to the end result if it is outcome determinative of the end result. In yet other embodiments, the particular tuple may substantially contribute to the end result if omitting processing of that partition would cause the end result to fall outside the threshold confidence level.

If, at operation 725, the determination is made that the particular tuple should be processed, the tuple will be processed according to the configuration of the streaming application in operation 730, and the processing history will be updated in operation 735. If, however, operation 725 results in a determination that the particular tuple should not be processed, the processing will be omitted in operation 740.

Figure 8:
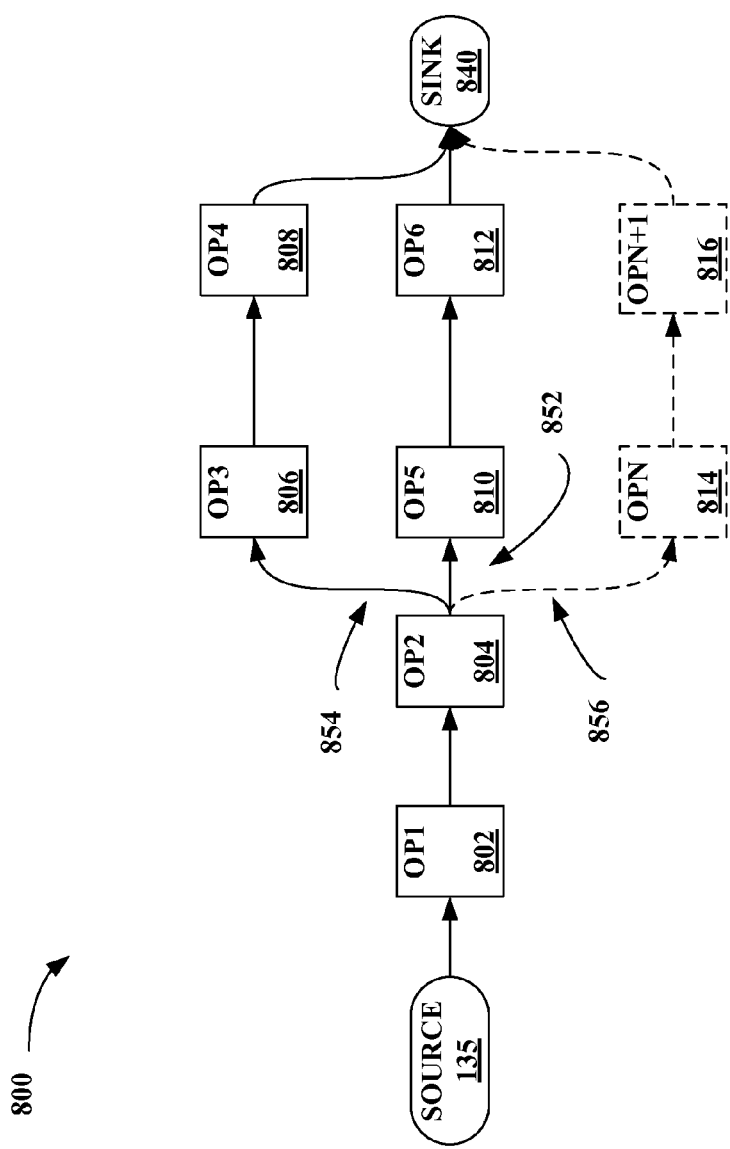
FIG. 8 illustrates a section of an operator graph for a streaming application that is configured with the method to determine whether to omit processing for a partition, according to various embodiments.

FIG. 8 illustrates a section of an operator graph 800 for a streaming application, according to some embodiments. The operations of methods 600 and 700 may be further described through an example streaming application, which will be discussed in accordance with FIG. 8. For example, a streaming application may receive data from sensors in automobiles as inputs via source 135. The data may, for example, include information about the speed and location of an automobile. The data output by each automobile may include additional information as well. Some type of processing may be completed at stream operator 802, and stream operator 804 may segment the data stream into partitions, as described above. FIG. 8 shows two partitions 852, 854, plus a representative partition 856 to show that there may be N different partitions of a data stream, where N is based on a specific streaming application. Using the automobile data example, the streaming application may be configured to provide an end result at sink 840 that represents the average speed of automobiles across the major US highways. Such a streaming application may, for example, be configured to include one partition per zip code. Each partition may include additional stream operators 806, 808, 810, 812, 814, and 816 that complete some type of processing according to the configuration of the particular streaming application. It may be possible to only process data from a subset of the zip codes and still have an end processing result that is representative of the answer where all processing is completed. For example, there may be zip codes that do not include any major highways, or that generally have so few cars that the end result is not substantially affected by omitting the processing.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including:

(a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for processing a stream of tuples, comprising:
   receiving the stream of tuples for processing by a plurality of processing elements to produce a processing result;
   segmenting the stream of tuples into a plurality of partitions, each of the plurality of partitions including a subset of the stream of tuples;
   maintaining a processing history for each of the plurality of partitions, the processing history including input values for tuples in the partition and further including output values for the tuples in the partition;
   determining that a performance metric falls outside a performance threshold, the performance metric associated with the processing by the plurality of processing elements to produce the processing result;
   determining, based on the processing history of a first partition and further based on the determining that the performance metric falls outside the performance threshold, that tuples in the first partition substantially contribute to the processing result;

determining, based on the processing history of a second partition and further based on the determining that the performance metric falls outside the performance threshold, that tuples in the second partition do not substantially contribute to the processing result;

continuing the processing of the tuples in the first partition by the plurality of processing elements; and discontinuing the processing of the tuples in the second partition by the plurality of processing elements.

2. The method of claim 1, wherein the determining that the tuples in the first partition substantially contribute to the processing result and the determining that the tuples in the second partition do not substantially contribute to the processing result is enabled within a window.

3. The method of claim 1, wherein the determining that the tuples in the second partition do not substantially contribute to the processing result is associated with a confidence level, the method further comprising:

determining, after the discontinuing the processing of the tuples in the second partition, that the confidence level falls outside a modification threshold; and resuming the processing of the tuples in the second partition based on the determining that the confidence level falls outside the modification threshold.

4. The method of claim 1, further comprising resuming the processing of the tuples in the second partition at a time interval.

5. The method of claim 1, wherein the determining that the tuples in the first partition substantially contribute to the processing result comprises:

determining that a confidence level falls outside a modification threshold.

\* \* \* \* \*